Jan. 5, 1965 C. L. MACK 3,163,974
AUTOMATIC HEIGHT CONTROL FOR COMBINE HEADER
Filed Oct. 5, 1962 3 Sheets-Sheet 1
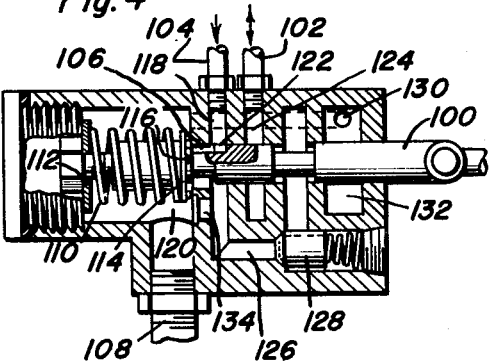
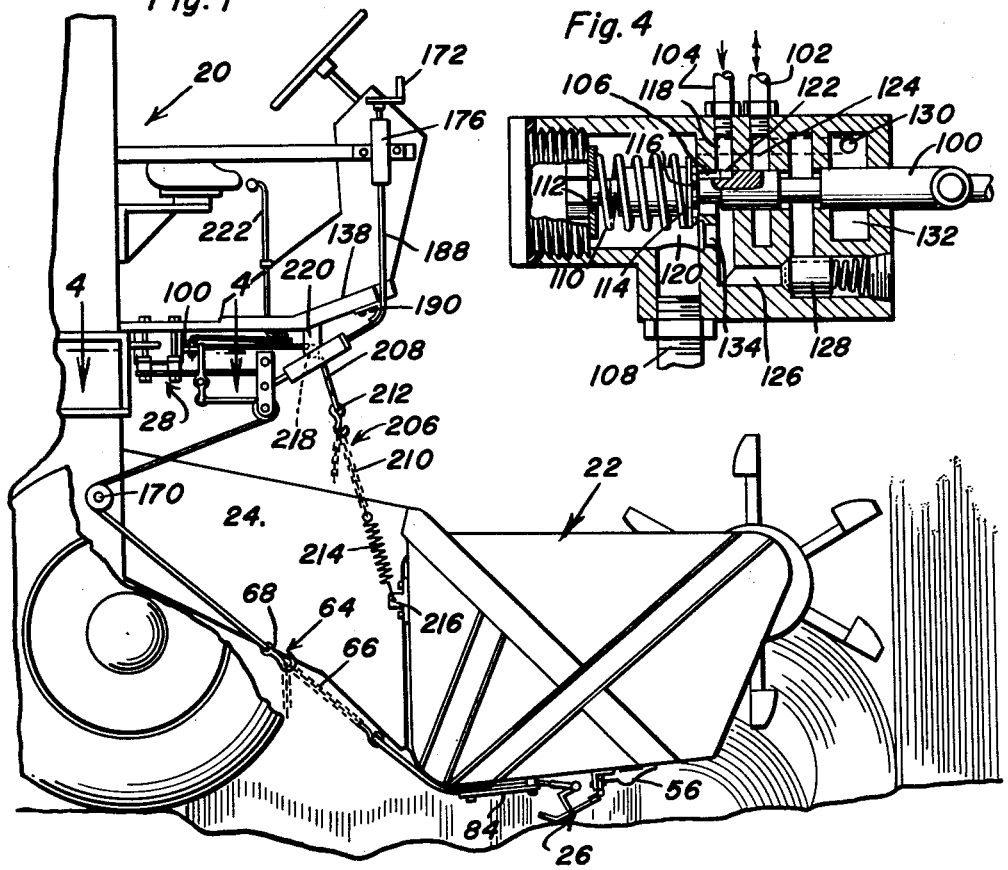
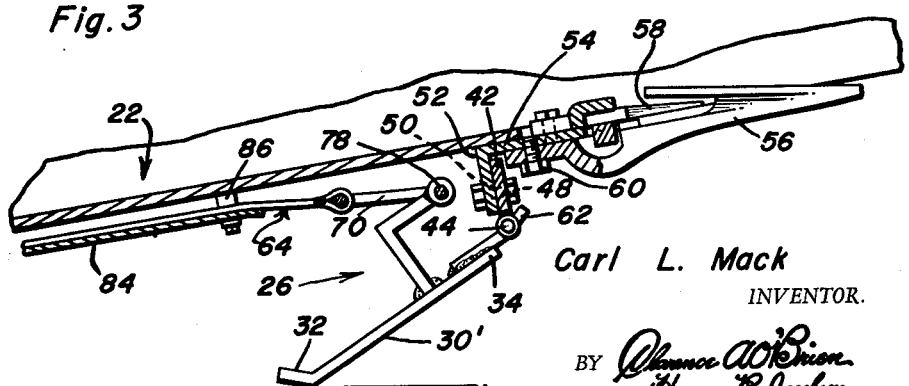
Carl L. Mack
INVENTOR.

Carl L. Mack
INVENTOR.

Jan. 5, 1965     C. L. MACK     3,163,974
AUTOMATIC HEIGHT CONTROL FOR COMBINE HEADER
Filed Oct. 5, 1962     3 Sheets-Sheet 3
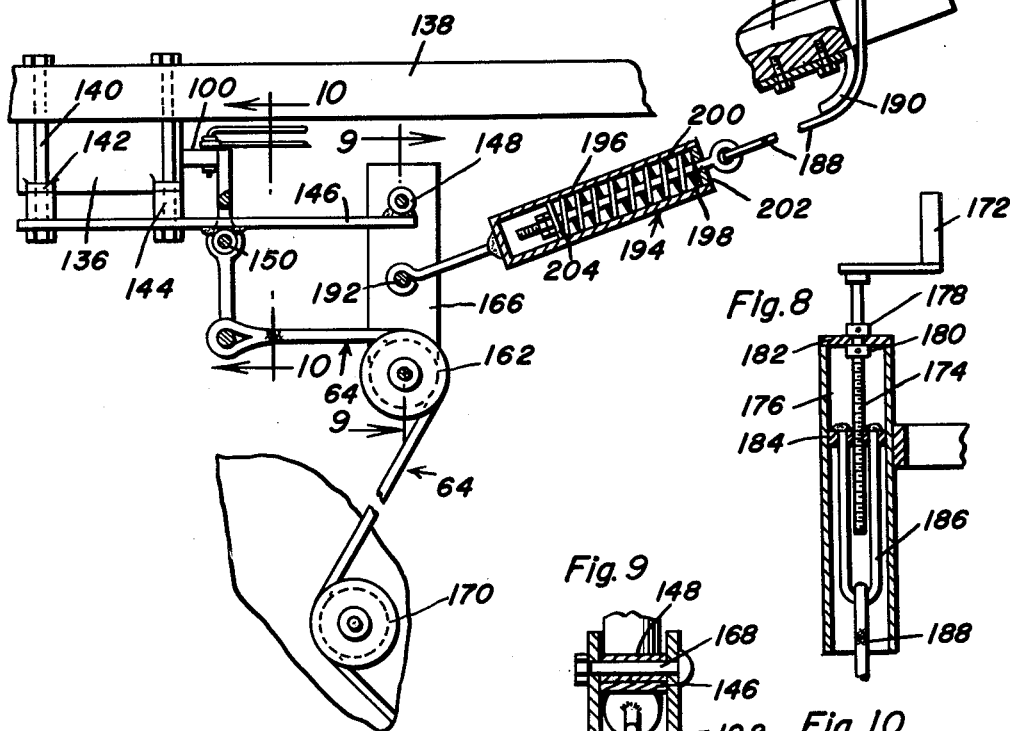
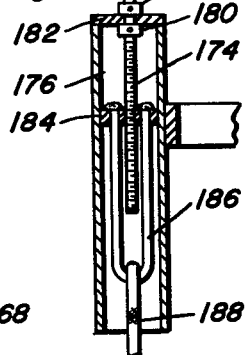
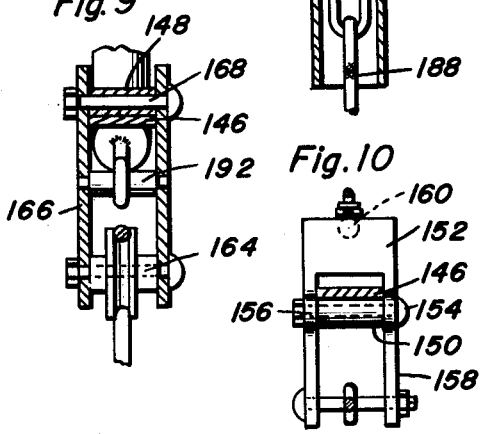
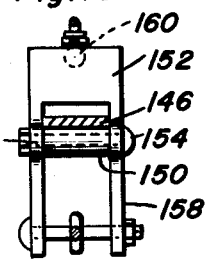
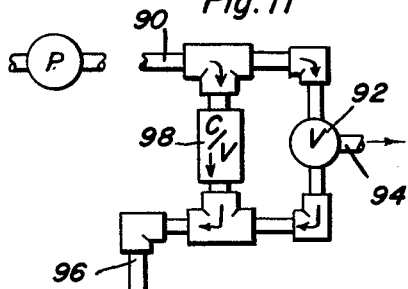
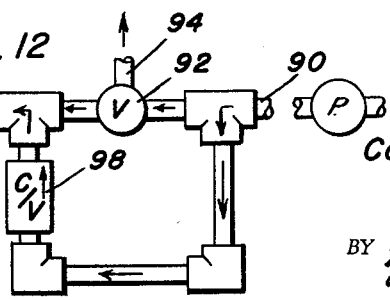
Carl L. Mack
INVENTOR.

United States Patent Office 3,163,974
Patented Jan. 5, 1965

3,163,974
AUTOMATIC HEIGHT CONTROL FOR
COMBINE HEADER
Carl L. Mack, R.R. 3, Wapakoneta, Ohio
Filed Oct. 5, 1962, Ser. No. 228,680
7 Claims. (Cl. 56—214)

The present invention generally relates to combines, and more particularly to the combine header and means for automatically adjusting the height of the header so as to accommodate variations in ground level.

In the use of self-propelled combines to harvest many crops such as for example soybeans which grow the seed pods close to the ground, problems frequently arise because of the necessity of positioning the header so as to reduce as much as possible any costly loss of the crop. However, because of the various ground irregularities normally encountered, it is extremely difficult to maintain a constant sufficiently low cutting height, the header cutter bar in many instances being set either so high as to miss a substantial percentage of the crop, or so low that it frequently comes in contact with the ground causing costly work stoppages for cleaning the header as well as replacing broken guards. While it is of course possible to vary the height of the header by manual means, the necessity of the operator of the combine visually noting the various irregularities and making the necessary adjustments require a greatly reduced ground speed, also resulting in a costly loss of time. As will be appreciated by those familiar with the art, even a relatively small loss of time can mean the difference between getting the crop in or losing it in the field due to various bad weather conditions.

In order to overcome these difficulties, the present invention contemplates the provision of means for automatically controlling the header height by the use of ground-engaging finger-like sensing means for signalling ground surface variations and effecting the desired raising or lowering of the header. It is appreciated that the general concept of providing an automatic height adjustment for combine headers is not in itself new, however the present invention contemplates providing this adjustment in a highly novel and simplified manner capable of being easily adapted to most if not all of the more common types of combines.

Further, inasmuch as it is contemplated that the sensing means of the present invention will enable the positioning of the cutting bar within one or two inches of the ground, and inasmuch as such a positioning of the header will invariably result in broken guards, it is also a significant purpose of the present invention to provide a novel mounting of the fingers so as to enable easy access to the guards for the rapid changing thereof contrary to the manner in which similar prior art devices, while not avoiding the breaking of the guards when such small heights are to be maintained, make the changing of the guards a tedious and time-consuming operation. Of course, when heights of approximately three or more inches are to be maintained, any accidental breaking of the guards is substantially eliminated by the rapid response of the lifting ram or rams to the sensing device.

Likewise, an object of the present invention is the provision of a control valve unit wherein the response to the sensing unit is substantially instantaneous.

Also, it is an object of the present invention to provide means whereby the necessity of carrying a constant fluid pressure in the hydraulic system is avoided thus providing a noticeable increase of power, decrease in fuel consumption and decrease in pump wear over other combine header raising and lowering systems now in use. The only time any pressure is present in the pump line of the present invention is in those situations when the header is being raised in response to the sensing unit.

In addition, the present invention contemplates the provision of a sensing unit consisting of a plurality of wide fingers so as to ensure the proper recognition of the ground variations.

Furthermore, it is an object of the present invention to provide for the automatic control with a generally simple and commercially feasible device presenting a maximum amount of convenience to the combine operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates the forward portion of the combine with the header thereon and the automatic control system mounted in operative position;

FIGURE 3 is an enlarged cross-sectional view taken substantially on a plane passing along line 3—3 in FIGURE 2;

FIGURE 4 is an enlarged cross-sectional view taken substantially on a plane passing along line 4—4 in FIGURE 1 and illustrating one form of valve unit;

FIGURE 7 is an enlarged elevational view with portions broken away of the portion of the control device mounted on the combine operator's platform;

FIGURE 8 is a cross-sectional view through the platform mounted adjusting means for the cutting height;

FIGURE 9 is a cross-sectional view taken substantially on a plane passing along line 9—9 in FIGURE 7;

FIGURE 10 is a cross-sectional view taken substantially on a plane passing along line 10—10 in FIGURE 7;

FIGURE 11 is a schematic diagram of one hydraulic fluid flow pattern; and

FIGURE 12 is a schematic view of a slightly modified flow pattern.

Figure 2:
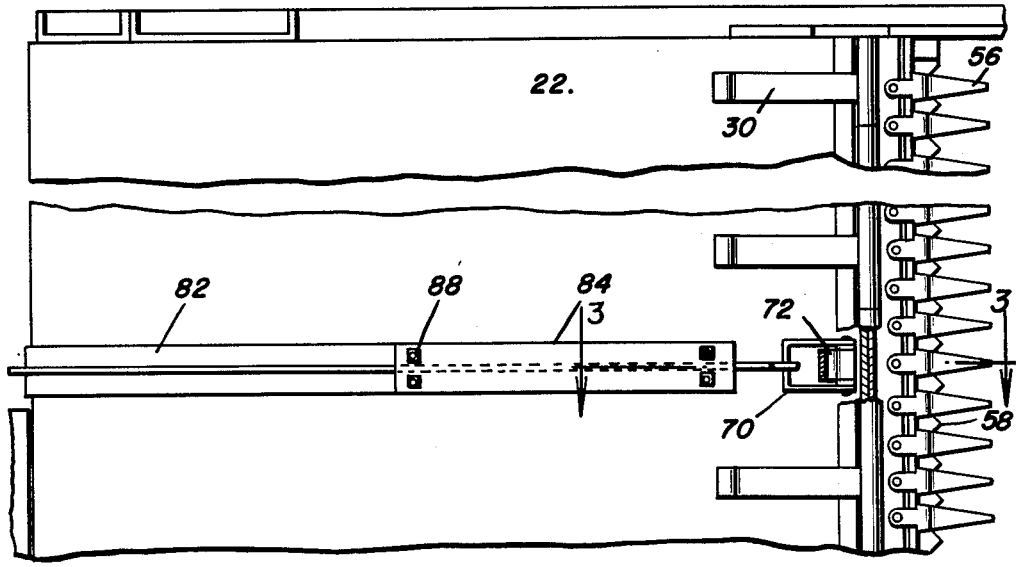
FIGURE 2 is an enlarged bottom view of the header of FIGURE 1.

Referring now more specifically to the drawings, reference numeral 20 generally designates a combine of the type including a header 22 mounted for vertical adjustment by hydraulic ram means (not shown), a feeder throat 24 also being provided in communication with the rear of the header 22.

In improving on this basic mechanism, means are provided for automatically actuating the ram or rams so as to control the height of the header with this automatic means consisting of a sensing unit 26 and a control unit 28 responsive thereto.

The sensing unit 26 consists essentially of a plurality of rearwardly extending substantially wide fingers 30, the rear ends 32 of which are angled upwardly and the forward ends 34 of which are rigidly affixed to a transversely extending flat bar 36 at spaced points therealong for the full length thereof with the bar 36 extending substantially the full width of the header 22. The bar 36 is provided with a plurality of elongated spaced sleeves 38 with the sleeves 38 being positionable between similar sleeves 40 on an elongated bar 42, an elongated rod 44 extending through the aligned sleeves 38 and 40 so as to provide a piano-type hinge between the bars 36 and 42.

The substantially vertically orientated bar 42 is provided with a plurality of spaced apertures 46 for the reception therethrough of bolts 48 which extend through similar apertures 50 in the depending leg 52 of an angle member, the horizontal leg 54 of which is secured to the undersurface of the header 22. Conventionally provided guards 56 are provided slightly forward of the bar 42 and in protective relationship to the cutter bar or blades 58.

Figure 5:
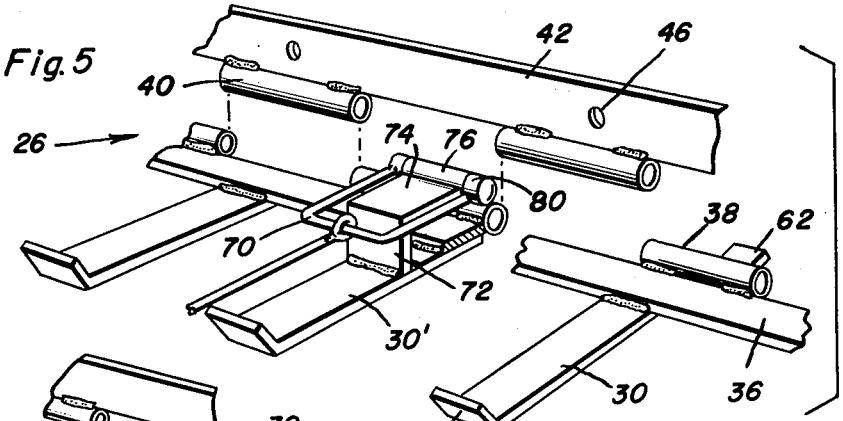
FIGURE 5 is an exploded perspective view of a portion of the sensing unit.
Figure 6:
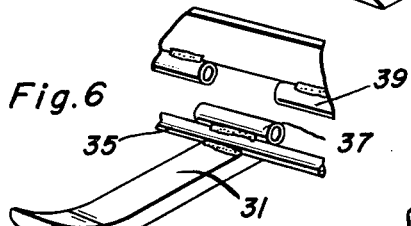
FIGURES 6 and 6A are perspective views of modified forms of the portion illustrated in FIGURE 5.
Figure 6A:
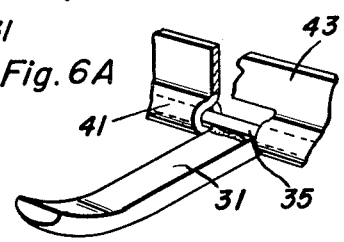

Attention is now directed toward FIGURE 6 wherein a modification of the structure of FIGURE 5 is illustrated, this modification using half round sensing fingers 31 welded to a transversely extending round bar 35 which has sleeves 37, similar to sleeves 38 secured thereto, these sleeves 37 being positionable between similar sleeves 39 for the reception of an elongated rod therethrough thus providing a piano-hinge. FIGURE 6A illustrates a further modification wherein longitudinally spaced sleeves 41 provided on the bar 43 are engaged directly about the round bar 35 thus eliminating the use of the sleeves 37 illustrated in FIGURE 6. While the specification has been drawn so as to only describe the embodiment of FIGURE 5 in detail, it is also intended that the scope of the invention include the modifications of FIGURE 6 and FIGURE 6A.

It will be realized by those familiar with the art, the fingers 30, in order to prevent an unnecessary matting down of the crops prior to the cutting, must be provided to the rear of the cutting bar 58 but as close thereto as feasible so as to ensure the proper elevation of the cutting bar 58. However, inasmuch as the guards 56 tend to frequently break, especially when the header is set extremely low such as is necessary for various types of crops such as soybeans, it is essential that the operator of the combine have easy access to the guard securing bolts 60 so as to facilitate their changing with a minimum amount of effort and time loss. The above described manner of mounting the fingers 30 provides for the desired movement of the ground feeling fingers 30, as shall be gone into presently, while at the same time not interfering with any necessary changing of the guards 56. In order to further ensure this non-interference, the bolts 48 are provided at points spaced from the guard bolts 60, and further, the lug 62 provided on at least one sleeve 38 and acting as a stop to limit the downward pivotal movement of the fingers 30, is also positioned out of alignment with the bolts 60.

As will be appreciated, the fingers 30 contact the ground surface and follow the contours thereof, pivoting both upwardly and downwardly with this movement being transferred to the control mechanism through a control cable 64, an intermediate portion 66 of which consists of a section of link chain maintained in position by a hook 68 at at least one end thereof with the hook 68 being positionable in various different links of the chain 66 so as to allow for an adjustment of the control cable 64. The sensing means end of the cable is provided with a suitable bracket means 70 which is in turn pivotally connected to the finger 30' closest to one side of the feeder throat 24 so as to locate this cable 64 as close to the center of the header as feasible. This finger, 30', is similar in all respects to the fingers 30 except for the provision thereon of an angle member having the vertical leg 72 thereof rigidly affixed to the upper surface of the finger 30' and having the horizontal leg 74 extending forwardly and terminating in a journal means 76 at its forward end, the bracket 70 being pivotally secured to this forward end by a pivot rod 78 extending both through the journal 76 and through journals 80 provided on the aligned forward ends of the bracket 70. It will be appreciated that such an arrangement allows the translation of the pivotal movement of the fingers 30 into a substantially horizontal movement of the cable 64 throughout the generally limited range of movement contemplated.

In order to guide the control cable 64 past the rear end of the header 22, an elongated wear plate 82 is secured to the bottom surface of the header 22 in line with the cable 64 and conforming to the normally rounded rear edge of the header 22. In addition to the wear plate 82, a second wear plate 84 is provided forwardly thereof and spaced slightly outwardly therefrom by spacers 86 having bolts 88 therethrough to secured this plate to the bottom of the header 22. As will be appreciated from FIGURE 3, the cable 64 directly to the rear of the finger 30' tends to fall away from the undersurface of the header 22, and as such, the plate 84 functions to maintain the proper orientation of this cable 64 which is in turn centered by the spacers 86 through which the cable 64 extends. As the cable 64 approaches the rear of the undersurface of the header 22 it engages against the wear plate 82 which is secured directly to the bottom of the header 22 and curved about its rear edge so as to follow the path of the cable 64 which subsequently extends upwardly and rearwardly as shall be gone into presently.

Turning now to the control mechanism 28, in order to achieve the rapid adjustment required, an open center 3-way hydraulic valve is provided with the valve being spring-loaded internally so as to return to the center position automatically from either the raising or lowering position. When the valve is on center, there is a free flow of fluid from the pump through the open center of the valve and back through the return line to the supply tank. This center position is to also be the hold position for the rams with the oil in the rams being locked off from the rest of the system. The control valve spool is to be moved in one direction from center to cause the raising of the header and in the opposite direction to cause the lowering of the header, the lowering of the header being accomplished by the weight of the header forcing the oil out of the rams and into the return line. In the raising of the header, the control valve spool is moved to first shut off the return line from the pump line and subsequently connect the ram line to the pump line with the pump then forcing the fluid into the rams and causing the raising. However, inasmuch as the movement of the control valve spool is controlled by the header fingers 30 which are responsive to variations in the ground level, the possibility always arises that the valve will be held in a position wherein the return line is closed off and the ram line has not yet been opened. As can be appreciated, the spool held in this position causes a constant pressure to be carried, this pressure being both useless and expensive, and as such, highly undesirable. Accordingly, a highly significant feature of the present invention is the provision of a by-pass containing a one-way check valve and being connected between the pump line and the ram line thus entirely eliminating the necessity of using pump pressure to carry the header, the carrying of the header always being accomplished by the locking of the oil in the rams by the control valve. This arrangement is diagrammatically illustrated in FIGURES 11 and 12 wherein the flow proceeds through the pump line 90 through the control valve 92 and to either the return line 94 or the ram line 96, or conversely, through the pump line 90 and through the by-pass check valve 98 directly to the ram line 96. As will be appreciated, the use of a by-pass 98 enables the passage of the fluid directly from the pressure line to the ram line without encountering any delay in waiting for the contral valve spool to move sufficiently so as to connect the two lines.

For a specific illustration of the foregoing, attention is directed to FIGURE 4 wherein one type of combined control valve and by-pass has been illustrated in detail, it of course being appreciated that the present invention contemplates both the use of a by-pass constructed integrally with the entire valve unit, and also the provision of the by-pass as a separate attachment, the by-pass in all instances being connected between the ram line and the pump line with the check valve installed so as to enable passage of the fluid from the pump line to the ram line at all times. In FIGURE 4, the control valve spool 100 is moved to the left to raise the header 22 and is moved to the right to allow the lowering of the header 22 under its own weight. The position illustrated is the hold or center position with the fluid being locked in the ram line 102 by the spool 100 and with the fluid from the pump line 104 flowing freely through the opening 106 in the valve wall and out the return line 108, the pump in this way carrying no pressure. The spring 110 provided between the washers 112 and 114 is provided so as to always return the spool 100 to its center position as illustrated, with the washer 114 having a plurality of small protuberances 116 thereon so as to space the washer away from the valve wall thus allowing the free passage of the fluid from the pump port chamber 118 to the return port chamber 120. Further, the valve spool 100 is to be provided with two small indentations 122 orientated so that when the spool 100 is moved to the right or lowering position, these indentations 122 are partially exposed in the ram port chamber 124 thus allowing a restricted flow of fluid back into the return port chamber 120 thus allowing the heavy combine header 22 to be lowered rapidly but smoothly. As will be appreciated, this lowering of the header 22 is accomplished solely by the weight of the header 22 forcing the fluid through the valve and out the return line 108.

In the raising of the header 22, the spool 100 is moved to the left with the fluid flow through the pump line 104 and into the return chamber 120 being shut off with the exception of the fluid passing through the indentations 122. The pressure at this time immediately starts to build-up with the maximum pressure being reached when the indentations 122 are closed. A further movement of the spool 100 to the left communicates the ram port chamber 124 with the pump port chamber 118 thus allowing for the passage of the fluid from the pump line into the ram line and causing the raising of the header 22. As mentioned supra, it will be noted that throughout a small portion of the movement of the spool 100 the return port chamber 120 will be sealed without the ram port chamber 124 being opened thus causing a carrying of the pressure with no raising action being accomplished. It will also be appreciated that the spool 100, being controlled by the ground-engaging fingers 30, could conceivably be maintained in this position a substantial portion of the time. Accordingly, the by-pass 126 is provided with a spring-biased one-way check valve 128 being located therein, this arrangement enabling the immediate transfer of the pump pressure to the rams without the necessity of waiting for further movement of the valve spool 100. Immediately upon the pressure being introduced to the rams, the header 22 is raised, the sensing device disengaged and the spool 100 returned to its central position by the spring-biasing means 110 thus enabling the free venting of the pressure through the return line 108 thus avoiding any unnecessary carrying of the pressure which, in addition to the expense involved, tends to cause an unnecessary wear on the system. Attention is also directed to the fact that the particular valve unit illustrated in FIGURE 4 also includes a return 130 so as to enable the return of any fluid which might enter into the chamber 132, and a built-in pressure relief valve 134 so as to allow the fluid to escape from the pump chamber 118 to the return chamber 120 thus preventing damage when the valve is held on raise too long and the rams or ram are extended to their limits.

With attention now being specifically directed toward FIGURES 1 and 7, it will be noted that the valve housing 136 is secured beneath the combine operator's platform 138 by four elongated bolts 140 extending through the platform 138 and outward projecting lugs 142 on the housing 136. Mounted beneath the valve unit and spaced slightly therefrom by tubular spacers 144 is an elongated flat plate 146 having a first transversely extending journal 148 mounted on its upper surface near the outer edge thereof, and a second transversely extending journal 150 mounted on the bottom surface of the plate 146 and extending transversely thereof positioned vertically beneath and slightly forward of the outwardly projecting end of the control valve spool 100. An actuating lever 152 is pivotally mounted by a rod or bolt 154 extending through the journal 150 and through aligned bearings 156 provided in the bracket legs 158 which straddle both the plate 146 and the journal 150. As will be appreciated, the upper portion of the bracket is engaged with the forward face 160 of the spool 100 with the lower portion of the bracket 152 having the upper end of the control cable 64 secured thereto whereby an upward movement of the sensing fingers 30 causes a pull on the cable 64 and a pivoting of the bracket 152 so as to push in the spool 100 thus effecting the raising of the header 22 as gone into in great detail supra.

As will be appreciated from the drawings, the control cable 64 extends substantially horizontally forward from the lower end of the lever 152, over a first roller 162 rotatably mounted on an axle means 164 extending between two depending plates 166 rotatably mounted by an axle means 168 extending through the plates 166 and the journal 148. After passing over the roller 162, the control cable 64 extends rearwardly around a second roller 170 also rotatably mounted in any suitable manner, this second roller 170 being specifically provided in axial alignment with the center of the pivot point of the header 22 where the header is pivotally secured to the combine frame. This placement of the roller 170 is considered particularly important in that it enables the raising and lowering of the header 22 without causing any appreciable tensioning or slacking of the cable 64. After being positioned about the roller 170 the control cable 64 extends forwardly through the wear strips 82 and 84 and into engagement with the sensing unit, the adjustable chain section 66 being provided between the roller 170 and the header. The use of the hook 68 enabling the simplified removal of the complete header 22, and further providing a means for quickly obtaining the initial proper working or cutting height of the cutter bar 58 with any subsequent minor adjustments being taken care of from the operator's platform in a manner which shall be gone into presently.

After the initial cutting height is set, any further small adjustments which might be required are provided by the adjusting handle 172 which is provided with a depending threaded shaft 174 maintained in a hollow vertical housing 176 by two collars 178 and 180 positioned both above and below the top 182 of the housing 176. Within the housing 176, the threaded shaft is rotatably engaged within a plate 184 mounted for movement solely in a vertical direction and having a U-shaped yoke 186 secured thereto and depending therefrom. A cable 188 is secured to the bight portion of the yoke 186 and extends downwardly therefrom around a suitable convex wear bracket 190 secured to the bottom of the operator's platform 138 and to an intermediate portion of the bracket formed by the depending plates 166 where the cable 188 is engaged about a transversely extending pin 192. As will be appreciated, an adjustment of the control cable 64 can now be accomplished from the operator's platform by rotating the crank handle 172. Further, it will be noted that a spring-tensioned unit 194 is provided intermediate the length of the cable 188, this unit 194 consisting of an enclosed housing 196 having an elongated rod 198, secured at one end to the cable 188, extending therein and tensioned by a spring means 200 located between the closed top 202 of the housing and an adjustable washer 204 provided at the lower end of the bolt 198. The particular purpose of this unit 194 is to provide a slight amount of give in the raising mechanism, this being necessary because of the small amount of movement of the control valve spool 100 between the center and full raised positions. This extra give will for example be needed when the fingers strike a stone or hit an exceptionally sharp rise in the ground level thus requiring more give than the movement of the valve spool will normally allow. The unit 194, in such instances, acts to protect the entire system from damage. It will also be noted that this unit 194 will provide the extra length needed when the combine is standing idle with the header being settled fully to the ground.

To effect the lowering of the header 22, an elongated cable 206 is provided, this cable 206 consisting of three portions, a first length of flexible wire 208 secured at one end to the valve spool 100, a second portion consisting of a link chain 210 releasably secured to the wire 208 by hook means 212, and a third portion consisting of tension spring means 214 secured between the chain 210 and a bracket 216 provided on the header 22. This spring means 214 will, of course, have to be sufficiently strong so as to overcome the valve spring thus moving the spool 100 from the center position to the lowering position, the wire 208 extending over a suitable roller means 218 supported by a bracket 220 so as to extend substantially horizontal from the outer end of the valve spool 100 to which it is suitably secured.

In addition to the automatic controls, it is also contemplated that the system include a manual control consisting of a single vertical control stick 222 located on the combine operator's platform and connected through suitable linkage to the valve spool 100 whereby the spool 100 may be moved in or out by merely pivoting the control rod 222.

Accordingly, it will be appreciated that the combine header 22 can be controlled either manually or automatically with the manual control being used for standing crops such as wheat or oats. When harvesting such standing crops, the hook 212 is engaged in the end link of the chain 210 thus disengaging the automatic control, sufficient length being provided in the cable 206 so as not to pull the valve spool. However, when the operator of the combine wishes to make use of the automatic control, such as would be desirable in the harvesting of soybeans, the hook 212 is engaged within a predetermined link of the chain 210 which will pull the control valve 100 from the center or hold position to the lowering position when the header is a specified distance above the ground, as for example twelve inches. Accordingly, in such a situation, above twelve inches the valve spool will be on center and the header will be retained in position by the fluid locked in the ram chamber, however, upon the header being lowered to or slightly below twelve inches by the manual control, the automatic control will take over and the header will continue to lower until stopped by the sensing fingers, these fingers causing an inward movement of the spool toward the raising position.

From the foregoing, the ease and simplicity of operation of the present invention will be readily recognized. Upon approaching the crop, the operator of the combine need only push the manual control rod 222 so as to start the lowering of the header 22 from its up or carrying position, after the height at which the cable 206 is set is reached, the operator can release the control rod 222 and the header 22 automatically assumes the desired height in relation to the ground level. During the operation of the automatic control, it will be appreciated that the sensing fingers, being relatively wide, ensure the recognition of all grade variations for the full width of the header, the entire sensing unit being secured to the header behind the cutting blade and guards in such a manner so as to enable easy access when necessary to change the guards as will be required upon a setting of the header for extremely low crops such as soybeans. Likewise, it will be appreciated that the novel use of a by-pass check valve enables an adjustment of the header with only a minimum amount of pressure being necessary, this pressure being used solely to raise the header with the fluid being locked in the ram chamber so as to effect a holding of the header without additional pressure being necessary and with the fluid flowing freely from the pump line to the return line during such holding periods.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for automatically maintaining a constant cutting height for a pivotally mounted combine header controlled by pump supplied hydraulically operated ram means during a continuous operation of the pump so as to cause a constant flow of fluid, comprising, ground variation sensing means and control means for operatively connecting a pump with the hydraulic ram means, said control means, under a constant flow of fluid from the pump, having a raising position wherein the fluid is introduced under pressure into the ram means, a hold position wherein the flow of fluid from the pump freely circulates back to the pump and the fluid previously introduced into the ram means is locked therein, and a lowering position wherein the fluid locked within the ram means is released and the header lowers under its own weight, said control means consisting of a control valve, a pressure introducing pump line in communication therewith, a ram line extending from said control valve to the hydraulic ram means, a return line from said control valve to a fluid supply, said control valve containing a spool shiftable so as to assume the raising position, lowering position and holding position, said spool in the raising position communicating the pump line with the ram line and closing off said return line, said spool in the lowering position communicating both the pump line and the ram line with the return line, and said spool in the hold position sealing said ram line and communicating said pump line with said return line for a free flow of fluid therebetween, said spool, in moving from the hold position to raising position, first shuts off the return line completely and subsequently communicates the pump line with the ram line, and a by-pass one-way valve communicating the pump line directly to the ram line whereby when said spool is in a position closing both the return line and the ram line and introduction of a pressure build-up to the ram line resulting from a shutting off of the return line is achieved regardless of whether the spool moves sufficiently so as to communicate the pump line with the ram line within the control valve.

2. The combination of claim 1 wherein said combine header includes cutters and cutter guards, bolt means securing said guards to the undersurface of the header, said sensing means consisting of a first elongated bar, a plurality of rearwardly extending wide fingers secured thereto, a second elongated bar, said first bar being pivotally secured along one longitudinal edge to an adjacent edge of said second elongated bar, an elongated bracket rigidly secured to said header, an elongated depending leg on said bracket positioned directly behind the cutter guards and bolt means securing said second bar to said depending leg, said last mentioned bolt means being offset from the guard bolt means so to allow unencumbered access thereto for the rapid changing thereof.

3. Apparatus for automatically maintaining a constant cutting height for a pivotally mounted combine header controlled by pump supplied hydraulically operated ram means during a continuous operation of the pump so as to cause a constant flow of fluid, comprising, ground variation sensing means and control means for operatively connecting a pump with the hydraulic ram means, said control means, under a constant flow of fluid from the pump, having a raising position wherein the fluid is introduced under pressure into the ram means, a hold position wherein the flow of fluid from the pump freely circulates back to the pump and the fluid previously introduced into the ram means is locked therein, and a lowering position wherein the fluid locked within the ram means is released and the header lowers under its own weight, a control cable extending between and secured to the sensing means and control means for actuating the control means in response to movement of the sensing means, means for varying the actual length of the control cable, and separate means for varying the effective length of the control cable, said last mentioned means being operable while the apparatus is in operation, and including means for compensating for the introduction of any excess stress into the control cable; said control cable being journalled over a roller means axially aligned on the pivotal axis of the header whereby a constant length of cable is maintained throughout the effective ranges of adjustment of the header.

4. The combination of claim 3 wherein said combine header includes cutters and cutter guards, bolt means securing said guards to the undersurface of the header, said sensing means consisting of a first elongated bar, a plurality of rearwardly extending fingers secured thereto, a second elongated bar, said first bar being pivotally secured along one longitudinal edge to an adjacent edge of said second elongated bar, an elongated bracket rigidly secured to said header, an elongated depending leg on said bracket positioned directly behind the cutter guards and bolt means securing said second bar to said depending leg, said last mentioned bolt means being offset from the guard bolt means so to allow unencumbered access thereto for the rapid changing thereof.

5. The combination of claim 4 wherein the control valve is mounted adjacent the operating platform on the combine, a control cable, a first end of said cable secured to the sensing means, the second end of said cable operatively associated with the valve spool for moving said spool into the raising position from the hold position upon a raising of the fingers by engagement of the fingers with the ground surface, and a resiliently extensible tensioned cable having one end secured to the header and the second end operatively associated with the valve spool for moving said spool into a lowering position prior to the engagement of the fingers.

6. The combination of claim 5 including means for adjusting the relationship of the sensing fingers to the ground surface, means for compensating for the introduction of any excess stress into the control cable, and means connected to the valve spool for manually controlling the movement of the valve spool.

7. In a combine, a hydraulically controlled pivotally mounted header, a fluid pump, cutting means on said header along the forward edge thereof, ground engageable sensing means mounted on said header directly behind said cutting means, control means for enabling the automatic raising, lowering and holding of the header, a control cable secured between the sensing means and the control means for biasing the control means into a raising position upon engagement of the sensing means with the ground, said cable being journalled over a roller means axially aligned on the pivotal axis of the header, means varying the length of the cable for varying the effective orientation of the sensing means relative to the ground, said cable being journalled over a yieldable second roller means located between the first roller means and the control means, said second roller means being yieldable upon the introduction of excess stress into the control cable so as to compensate for this stress.

References Cited by the Examiner
UNITED STATES PATENTS 2,589,553　3/52　Kesselring _____ 56—210 X
2,750,727　6/56　Wright.
3,088,264　5/63　Sallee _____ 56—210

FOREIGN PATENTS 840,852　7/60　Great Britain.

T. GRAHAM CRAVER, *Primary Examiner.*
CARL W. ROBINSON, ANTONIO F. GUIDA,
*Examiners.*